United States Patent

Weck

[11] Patent Number: 6,115,354
[45] Date of Patent: Sep. 5, 2000

[54] MULTIPLE CARRIER TRANSMISSION IN COMMON-WAVE NETWORKS

[75] Inventor: Christfried Weck, Hallertau, Germany

[73] Assignee: Timlar Konle, Munich, Germany

[21] Appl. No.: 08/765,070

[22] PCT Filed: Jul. 20, 1995

[86] PCT No.: PCT/EP95/02868

§ 371 Date: Dec. 27, 1996

§ 102(e) Date: Dec. 27, 1996

[87] PCT Pub. No.: WO96/02989

PCT Pub. Date: Feb. 1, 1996

[30] Foreign Application Priority Data

Jul. 20, 1994 [DE] Germany .............................. 44 25 713

[51] Int. Cl.[7] .................................................. H04B 1/38
[52] U.S. Cl. .......................... 370/203; 370/208; 370/210
[58] Field of Search .................................... 370/203, 206,
370/207, 208, 326, 336, 347, 442, 498,
210; 375/200, 367, 376

[56] References Cited

U.S. PATENT DOCUMENTS

| 5,228,025 | 7/1993 | Le Floch et al. | 370/210 |
|---|---|---|---|
| 5,371,548 | 12/1994 | Williams | 370/206 |
| 5,600,672 | 2/1997 | Oshima et al. | 375/219 |
| 5,694,389 | 12/1997 | Seki et al. | 370/208 |
| 5,710,765 | 1/1998 | Lee et al. | 370/347 |

FOREIGN PATENT DOCUMENTS

| 2639495 | 5/1990 | France . |
|---|---|---|
| 7-273741 | 10/1985 | Japan . |

OTHER PUBLICATIONS

R. Brugger: "DAB–Gleichwellennetze bei 1.5 GHz". In: Rundfunktechnische Mitteilungen, vol. 38, No. 1, Jan. 1994, Norderstedt, Germany, pp. 14–23.

Ph.J. Tourtier et al.: "Multicarrier modem for digital HDTV terrestrial broadcasting". In: Signal Processing Image Communication, vol. 5, No. 5/6, Dec. 1993, Amsterdam, Netherlands, pp. 379–403.

B. Le Floch et al.: "Digital Sound Broadcasting to Mobile Receivers". In: IEEE Transactions on Consumer Electronics, vol. 35, No. 3, Aug. 1989, New York, US, pp. 493–503.

Primary Examiner—Chi H. Pham
Assistant Examiner—Frank Duong
Attorney, Agent, or Firm—Venable; Robert Kinberg; Catherine M. Voorhees

[57] ABSTRACT

In order to prevent wanted signal capacity from being reduced during OFDM modulation of digital coded data, control symbol protecting intervals in the frame head of each OFDM transmission frame are larger than data symbol protecting intervals in wanted data areas of each OFDM transmission frame. The length of data symbol protecting intervals is determined during demodulation and data symbol scanning times are then determined on the thus determined length of the protecting intervals.

11 Claims, 5 Drawing Sheets

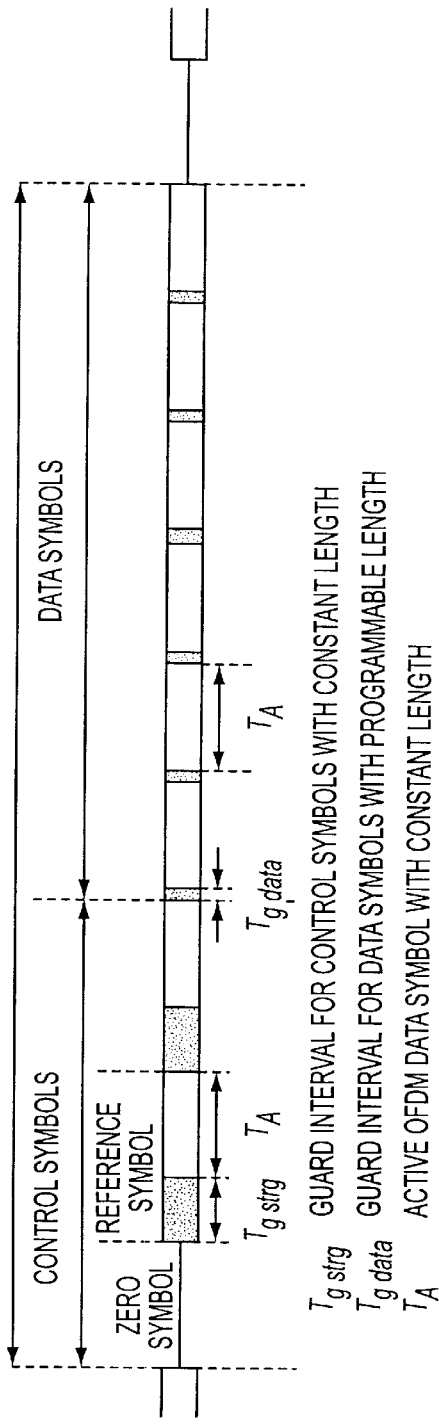
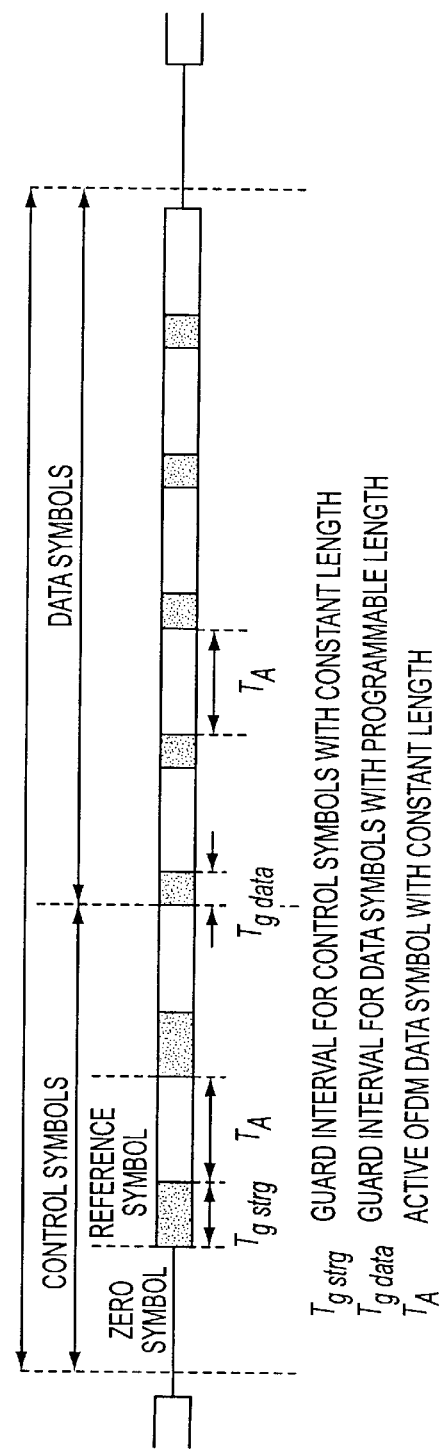
FIG. 2A
FIG. 2B

MULTIPLE CARRIER TRANSMISSION IN COMMON-WAVE NETWORKS

BACKGROUND OF THE INVENTION

The invention relates to a method for multiple carrier modulation of digitally coded data wherein a time sequence of OFDM symbols is generated which are patterned into successive OFDM transmission frames, each OFDM transmission frame including a frame head with one or several control symbols and a guard interval between successive control symbols, and to a method for multiple carrier demodulation of thus modulated signals. Methods of this type are known from FR-A-2 639 495.

In the known multiple carrier modulation (orthogonal frequency division multiplex modulation, abbreviated OFDM modulation) according to FR-A-2 639 495, a time sequence of OFDM symbols is generated by Fourier synthesis of many carriers modulated with digitally coded data. The OFDM symbols are patterned into successive OFDM transmission frames which are separated from one another, for example, by a zero symbol (FIG. 1). Each OFDM transmission frame is comprised of a frame head with one or several control symbols and a subsequent useful data range with a multiplicity of data symbols. In the OFDM decoder, the control symbols serve to recognize the beginning of each received OFDM transmission frame and OFDM symbol at the correct time as well as to recover the exact modulation carrier frequencies according to amount and phase. On the modulator-end, a guard interval is respectively provided between successive OFDM symbols (control and data symbols). Because of the guard interval, a crosstalk of successive OFDM symbols stemming from a multipath propagation can be prevented on the demodulator-end. Here, the time length of the guard intervals for all OFDM symbols in the frame head and in the useful data range of each OFDM transmission frame is identical.

It turned out, however, that in the event of great delay time differences at a receiving location, particularly in common-wave networks, the guard intervals must be designed to have a relatively long duration so as to reliably prevent crosstalk between successive OFDM symbols. As a result of such a long duration of the guard intervals, the useful signal capacity or the transmission efficiency is reduced. One option for remedying the situation might be that, along with an extension of the length of the guard intervals, the time length of the useful intervals is extended to the same degree. This, however, increases the expenditure on the demodulator end considerably. Namely the demands with respect to the precision of the scanning of the OFDM data symbols, to the volume of the scanned values to be stored as well as to the computing expenditure for the frequency analysis of the time signal given by the scanned values are increased in excess proportion. Therefore, a selected guard interval for an OFDM modulation system represents a compromise in which drawbacks with regard to the transmission capacity, the receiver expenditure and the frequency efficiency must be accepted from a network planning point of view.

SUMMARY OF THE INVENTION

In contrast, it is the object of the invention to avoid a reduction of the useful signal capacity in the majority of applications and, at the same time, to also consider the case of a common-wave network which extends over a large area.

This object is solved according to the invention by selecting guard intervals for the control symbols in the frame head of each OFDM transmission frame to be larger than the guard intervals for data symbols in the useful data range of each OFDM transmission frame.

A further solution is to determine the time length of the guard intervals for the data symbols in the useful data range of each received OFDM transmission frame and to determine the scanning moments for the data symbols as a function of the detected length of the guard intervals.

The invention is based on the recognition that large guard intervals are not necessary for all broadcasting services. There are differences, for instance, between local, regional and national network structures. Most critical is the supply of large areas in a common-wave operation. Starting from this recognition, it is the concept of the invention to design only the guard intervals for the frame head of each OFDM transmission frame for the worst conceivable application and to design the guard intervals for the OFDM symbols of the useful data range of each OFDM transmission frame to be dependent on the actually occurring delay time differences in a network under consideration.

BRIEF DESCRIPTION OF THE DRAWINGS

In the following, the invention is explained in greater detail by way of the drawings in which.

DETAILED DESCRIPTION OF THE INVENTION

Figure 3:
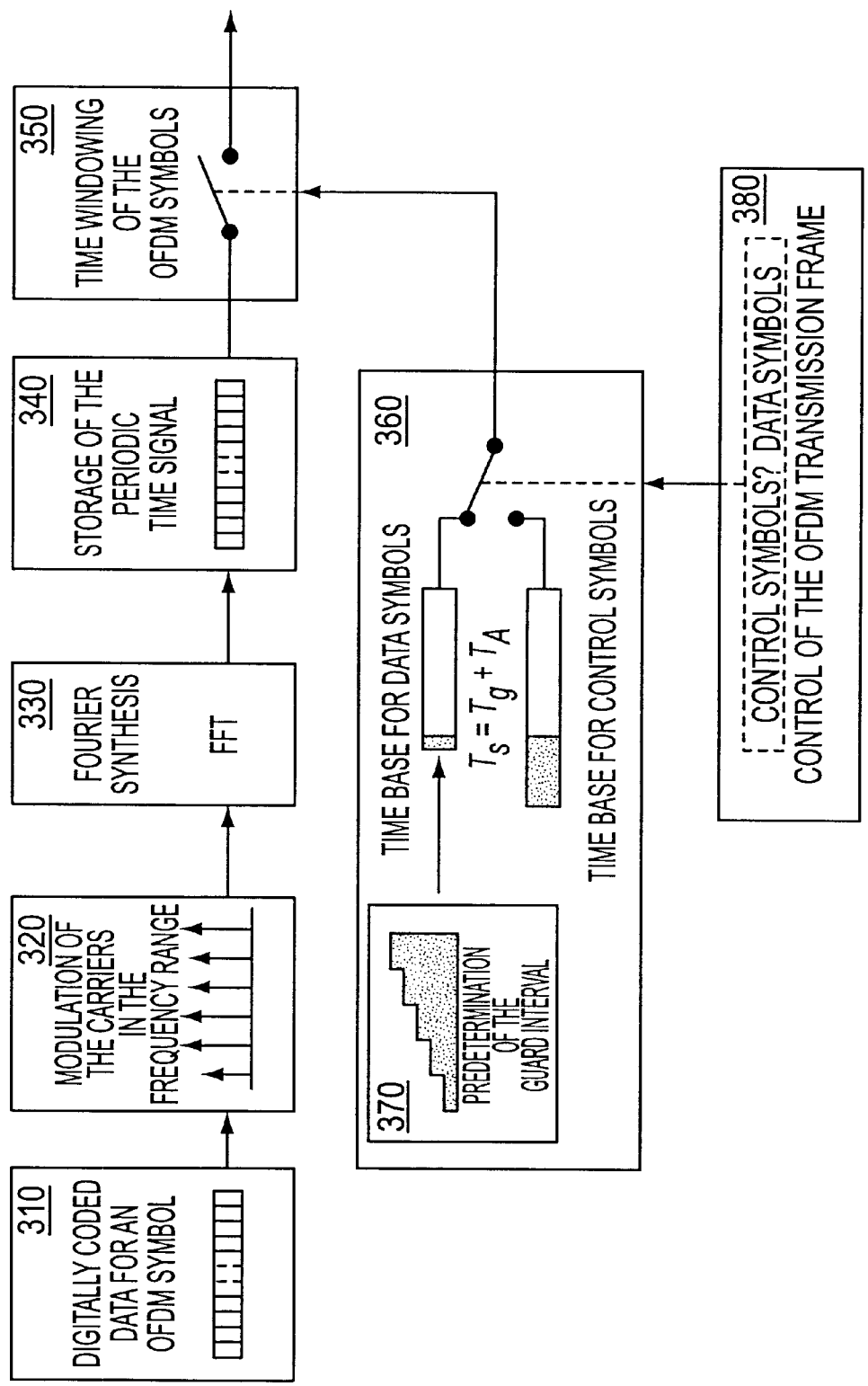
FIG. 3 is a block diagram of an OFDM modulator for generating an OFDM transmission frame according to FIG. 2.
Figure 4:
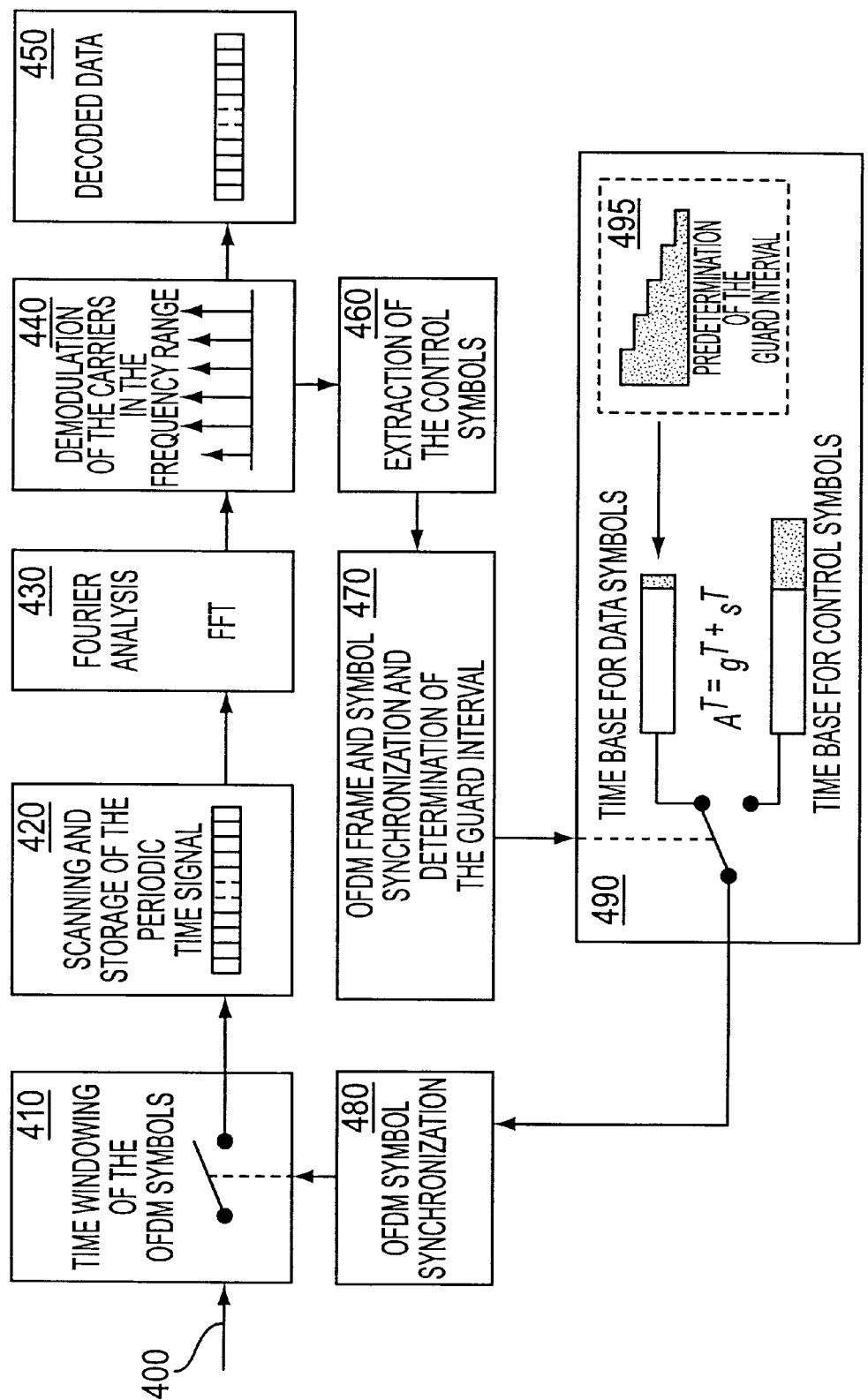
FIG. 4 is a block diagram of an OFDM demodulator for demodulating an OFDM transmission frame according to FIG. 2.

FIG. 3 shows the essential features of the OFDM modulation on the transmitting end. For forming an OFDM symbol, which represents the smallest transmission unit, a block of digitally coded data 310 is considered. In the frequency range 320, these are modulated upon a plurality of orthogonal carriers. In this process, standard, digital modulation techniques (e. g., QPSK, QAM, etc.) are applied to each carrier. By means of an inverse Fourier transformation 330, a time signal, which is periodic with the duration $T_A$, is synthesized. This periodic time signal, which comprises the entire information of the data block 310 and is available in the form of intermediately stored scanned values 340, is converted to an analog signal and transmitted for the symbol duration $T_S$. Here, the symbol duration $T_S$ is selected to be larger than the minimum required active symbol time $T_A$ which is determined by the cycle duration. The time by which the transmitted signal is extended is identified as a guard interval having the duration $T_g = T_s - T_A$.

Figure 1:
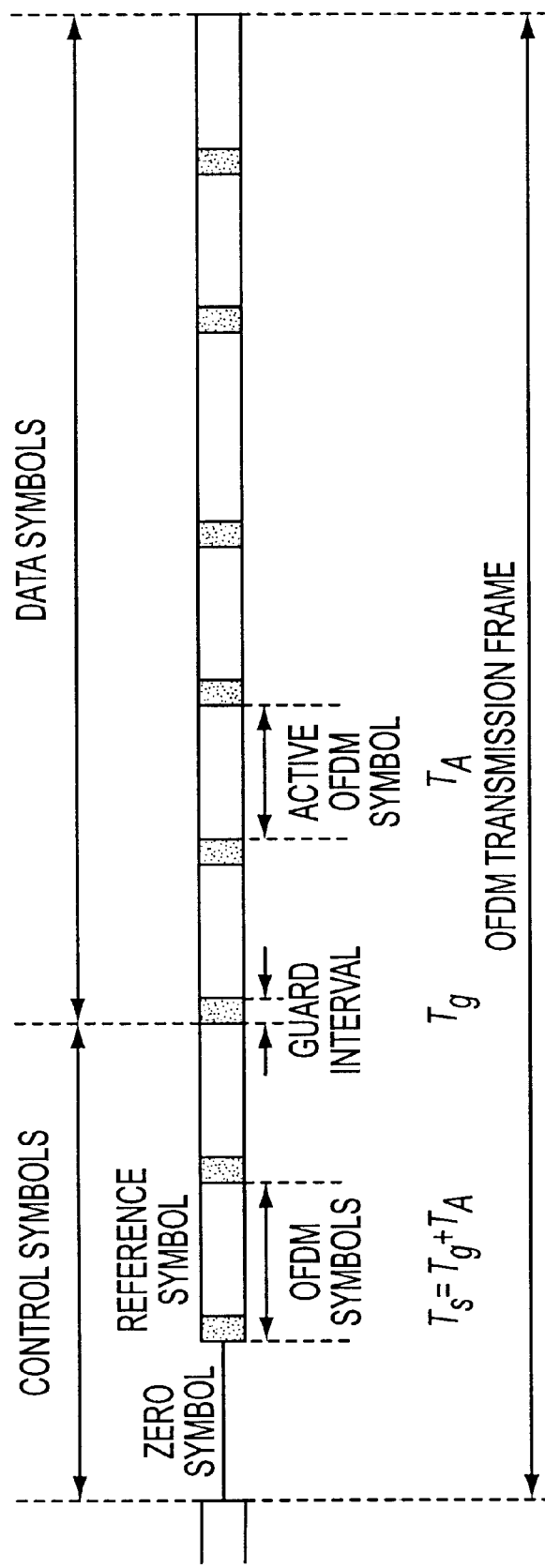
FIG. 1 is a schematic design of an OFDM transmission frame according to the prior art.
Figure 2C:
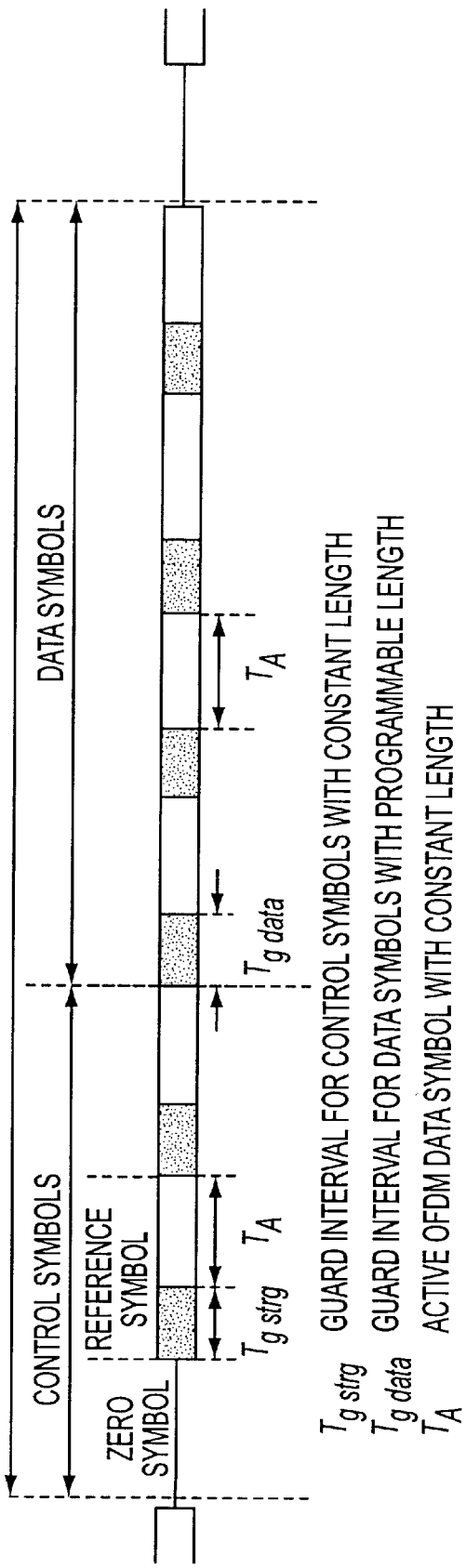
FIG. 2 is three examples of a schematic design of an OFDM transmission frame according to the invention.

According to the invention, the duration of the guard interval $T_{g\ strg}$ is selected to be larger for the control symbols than the guard interval $T_{g\ data}$ for the data symbols. This is accomplished by a changeover 360 which is controlled as a function of the position of the OFDM symbol in the OFDM transmission frame. Here, the size of the guard interval $T_{g\ strg}$ is selected such that a crosstalk of successive control symbols can be excluded even under critical conditions as they are to be expected in a common-wave network which extends over a large area. The guard interval $T_{g\ data}$, which can be selected from a set 370 of different guard intervals, is dimensioned such that in the event of actually occurring delay time differences, which result from the transmitter network structure that is realized in the individual case, any substantial crosstalk between successive data symbols does not occur. The selected duration for the guard intervals $T_{g\ data}$ of the data symbols can be signaled with the assistance of the control symbols. Thus, OFDM transmission frames with different guard intervals are created, as shown, for example, in FIGS. 2a) to c).

On the receiving end, a rough synchronization to the OFDM transmission frame takes place first. Within the symbol duration $T_S$ of the first transmitted OFDM symbol, the received time signal 400 is first scanned 420 for the cycle duration $T_A$ and analyzed by means of a Fourier transformation 430 in the frequency range. The transmitted data 450 are obtained by means of the demodulation of the individual carriers. A fine time synchronization is normally provided in that the first OFDM symbol represents a reference symbol which allows a computation of the pulse response of the transmission channel and, in addition, serves to obtain the carrier frequencies in amplitude and phase. With the pulse response of the transmission channel, all echoes are known in terms of their amplitude and delay time, which echoes occur in the multipath channel and in the common-wave network within the duration of the guard interval $T_{g\ strg}$ which is selected to be large.

The scanning of the subsequent OFDM symbols for a cycle duration $T_A$ is delayed by the respective guard intervals, as a function of the position of the OFDM symbol in the transmission frame, with the duration of the guard intervals being predetermined according to the invention for the control symbols and the data symbols by the control 490. Prior to that, the duration of the guard intervals $T_{g\ data}$ for the data symbols is signaled and selected from a set of different possible guard intervals 495.

The advantage of the method according to the invention is that, with a relatively low hardware expenditure, a flexibility of the duration of the guard interval is created which allows an optimization of the OFDM system from the point of view of implementation as well as network planning. A further advantage of the method also becomes evident when the echo delay time differences exceed the guard interval which is predetermined for the data symbols. As long as the control symbols are provided with a sufficiently large guard interval, an additional echo equalization for the data symbols is also possible by means of conventional methods due to the pulse response of the transmission channel, which pulse response is determined via the reference symbol.

What is claimed is:

1. An apparatus used in a transmitter and/or receiver for multiple carrier modulated (OFDM modulated) digitally coded data, comprising at the transmitter side:
means for generating a time sequence of OFDM symbols;
means for patterning said generated OFDM symbols into successive OFDM transmission frames, with each OFDM transmission frame being comprised of a frame head with one or several control symbols and an information data range with a plurality of data symbols, and with guard intervals preceding said data symbols; and comprising at the receiver side:
means for extracting said data symbols and said control symbols from the received OFDM symbols;
means for synchronizing the received OFDM symbols in response to the time length of said guard intervals;

wherein
a predetermined means provided at the transmitter side and at the receiver side for selecting in each OFDM transmission frame the time length of the guard intervals for said symbols to be shorter than the time length of the guard intervals for said control symbols.

2. An apparatus according to claim 1 wherein said predetermination means vary the time length of the guard intervals for said data symbols.

3. An apparatus according to claim 1, wherein the selected length of the guard intervals provided for the data symbols at the transmitter side is signaled to the receiver side by said control symbols, wherein a means at the receiver side is provided to detect the length of the guard intervals for the data symbols from the extracted control symbols, and a switching means at the receiver side is provided to switch the time lengths of the guard intervals for the OFDM symbols being selected by said predetermination means to said synchronizing means in response to said detection of the length of the guard intervals.

4. A method for multiple carrier modulation (OFDM modulation) of digitally coded data comprising the steps of:
generating a time sequence of OFDM symbols which are patterned into successive OFDM transmission frames, each OFDM transmission frame having a frame head with at least one control symbol and a useful data range for a plurality of data symbols;
providing a guard interval between successive control symbols and data symbols; and
selecting the guard interval between said successive control symbols in said frame head to be larger than guard intervals between said successive data symbols in said useful data range of each transmission frame.

5. The method according to claim 4, further comprising the step of varying the time length of the guard intervals for the data symbols in the useful range of each OFDM transmission frame.

6. The method according to claim 5, further comprising the steps of:
determining a time length of the guard intervals for the data symbols in a useful data range; and
determining scanning moments for the data symbols as a function of the detected time length of the guard intervals.

7. The method according to claim 4, further comprising the steps of:
determining a time length of the guard intervals for the data symbols in the useful data range of each OFDM transmission frame; and
determining scanning moments for the data symbols as a function of the detected time length of the guard intervals.

8. A method for multiple carrier modulation (OFDM modulation) of digitally coded data comprising the steps of:
modulating a plurality of orthogonal carriers in a frequency range by digitally coded OFDM symbols;
synthesizing a time signal, which is periodic with a duration of $T_A$ using an inverse Fourier transform;
storing the synthesized periodic time signal;
converting the periodic time signal to an analog signal;
selecting a duration $T_S$ of a symbol, which is larger than the periodic duration $T_A$ of the time signal such that $T_G = T_S - T_A$, where $T_G$ is a guard interval duration; and
transmitting said analog signal for the symbol duration over a channel.

9. The method according to claim 8, further comprising the steps of:
- selecting a guard interval duration from a predetemined set of available guard interval durations for control symbols in order to prevent crosstalk of successive control symbols;
- selecting a guard interval duration from a predetemined set of available guard interval durations for data symbols in order to prevent crosstalk of successive data symbols; and
- signaling the duration of the guard interval between data symbols with the assistance of control symbols.

10. A method for multiple carrier demodulation (OFDM demodulation) of digitally coded OFDM modulated symbols received over a channel comprising the steps of:
- roughly synchronizing an OFDM transmission frame having a plurality of OFDM symbols;
- scanning a received time signal of a first transmitted OFDM symbol for a cycle duration;
- analyzing said received time signal in a frequency range using a Fourier transformation;
- demodulating individual orthogonal carriers in the frequency range;
- finely synchronizing said OFDM transmission frame by computation of a pulse response of the channel;
- determining amplitude and phase of the individual orthogonal carriers; and
- scanning subsequent transmitted OFDM symbols delayed by guard interval durations for respective transmitted OFDM symbols as a function of position of the respective transmitted OFDM symbol in the OFDM transmission frame, said guard interval durations being predetermined for control symbols and for data symbols.

11. The method according to claim 10, further comprising the step of receiving and demodulating all remaining control and data symbols in the OFDM transmission frame.

* * * * *

UNITED STATES PATENT AND TRADEMARK OFFICE
CERTIFICATE OF CORRECTION

PATENT NO. : 6,115,354
DATED : September 5, 2000
INVENTOR(S) : Chrisfried Weck

It is certified that error appears in the above-identified patent and that said Letters Patent is hereby corrected as shown below:

On the title page, change line [54] to read —MULTIPLE CARRIER TRANSMISSION IN COMMON WAVE BROADCASTING NETWORKS—

On the title page, change line [73] to read — Tilmar Konle, Munich, Germany—

Signed and Sealed this

Fifth Day of June, 2001

*Attest:*

*Attesting Officer*

NICHOLAS P. GODICI

*Acting Director of the United States Patent and Trademark Office*